US009507120B1

(12) United States Patent
Bryant et al.

(10) Patent No.: US 9,507,120 B1
(45) Date of Patent: Nov. 29, 2016

(54) VISION SYSTEM WITH ARTICULATED SUPPORT FRAME

(71) Applicant: Exelis Inc., McLean, VA (US)

(72) Inventors: Mark A. Bryant, Troutville, VA (US); John B Hammond, Roanoke, VA (US)

(73) Assignee: Exelis Inc., McLean, VA (US)

( * ) Notice: Subject to any disclaimer, the term of this patent is extended or adjusted under 35 U.S.C. 154(b) by 176 days.

(21) Appl. No.: 14/496,106

(22) Filed: Sep. 25, 2014

Related U.S. Application Data (60) Provisional application No. 61/885,290, filed on Oct. 1, 2013.

(51) Int. Cl.
*G02B 7/12* (2006.01)
*G02B 23/18* (2006.01)
*G02B 7/00* (2006.01)

(52) U.S. Cl.
CPC ............... *G02B 7/12* (2013.01); *G02B 7/002* (2013.01); *G02B 23/18* (2013.01)

(58) Field of Classification Search
CPC ......... G02B 7/12; G02B 7/002; G02B 23/18
USPC ........................................................ 359/481
See application file for complete search history.

(56) References Cited

U.S. PATENT DOCUMENTS

| | | | |
|---|---|---|---|
| 2010/0229867 A1* | 9/2010 | Bertinetti | A61M 16/0051 128/205.25 |
| 2012/0200918 A1* | 8/2012 | Rivkin | G02B 23/125 359/481 |
| 2012/0273631 A1* | 11/2012 | Deros | F16M 11/041 248/122.1 |
| 2015/0002930 A1* | 1/2015 | Teetzel | G02B 23/18 359/409 |

* cited by examiner

*Primary Examiner* — Bumsuk Won
*Assistant Examiner* — Grant Gagnon
(74) *Attorney, Agent, or Firm* — Edell, Shapiro & Finnan, LLC (57) ABSTRACT

A vision system is supported by an articulated support frame having at least one proximal frame member coupled to an attachment device and a pair of distal frame members that retain optical devices in fixed mutual parallelism between optical axes of the optical devices and mounting axes of the distal frame members. A number of joints are mechanically interposed between the frame members that define respective axes of rotation about which the frame members are relatively moveable. The joints afford motion of the distal frame members through spatial trajectories over which the mounting axes diverge from mutual parallelism. A bridge device immobilizes the distal frame members on their trajectories in a binocular viewing configuration in which the mounting axis are parallel.

29 Claims, 12 Drawing Sheets

VISION SYSTEM WITH ARTICULATED SUPPORT FRAME

RELATED APPLICATION DATA

This application claims priority under 35 U.S.C. §119(e) from U.S. Provisional Patent Application No. 61/885,290 entitled "Stowable Optical Device," Oct. 1, 2013. The disclosure of this provisional patent application is incorporated herein by reference in its entirety.

TECHNICAL FIELD

The present disclosure relates to vision systems with foldable, collapsible or otherwise articulating support structures.

BACKGROUND

A vision system, as used herein, is any arrangement of optical elements supported on a suitable structural framework for purposes of viewing by a human individual. For binocular vision systems, a structural framework supports optics for each eye, referred to herein as monocular optics and it is the structural framework that establishes the separation of the monocular optics, so as to correspond with the interpupillary distance (IPD) of a particular human individual.

In the case of hands-free vision systems, i.e., those supported against gravity by engagement with the human body, the structural framework additionally establishes the relative positioning between the optics and the eyes of a particular individual. For hands-free vision systems configured for low magnification/wide viewing angle use, anthropometric differences between individual users can be met by a single structural framework design fabricated in a small number of standardized sizes. Eyeglasses are an example of such a system. However, at higher magnification, light emerges from the monocular optics through respective exit pupils, the diameter of which is established by the configuration of optics and by the mechanical components that maintain that configuration (the exit pupil can be understood as the image of the aperture stop formed at the output of the optical system by the interposing optics). When the exit pupil is not properly aligned with the ocular pupil, the resulting image appears as if cutoff by a phenomenon referred to as "vignetting." Similar issues arise in optical devices having constrained fields-of-view for reasons other than magnification. For example, in optical devices having active components in the optical path, such as in night vision goggles, the fields-of-view may be constrained by not only refractive optical elements, but light amplification or intensification mechanisms as well (e.g., photocathodes, microchannel plates, cascaded image intensifier tubes, etc.).

Figure 1A:
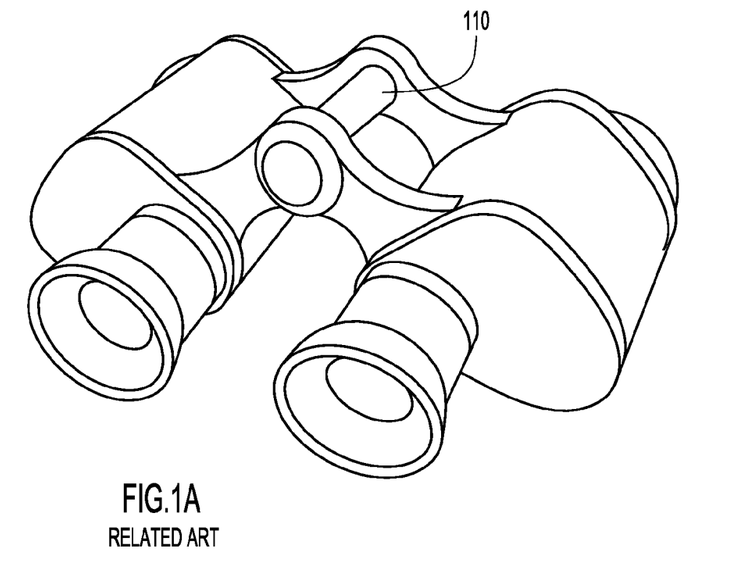
FIGS. 1A-1B are illustrations of convention binocular implementations.
Figure 1B:
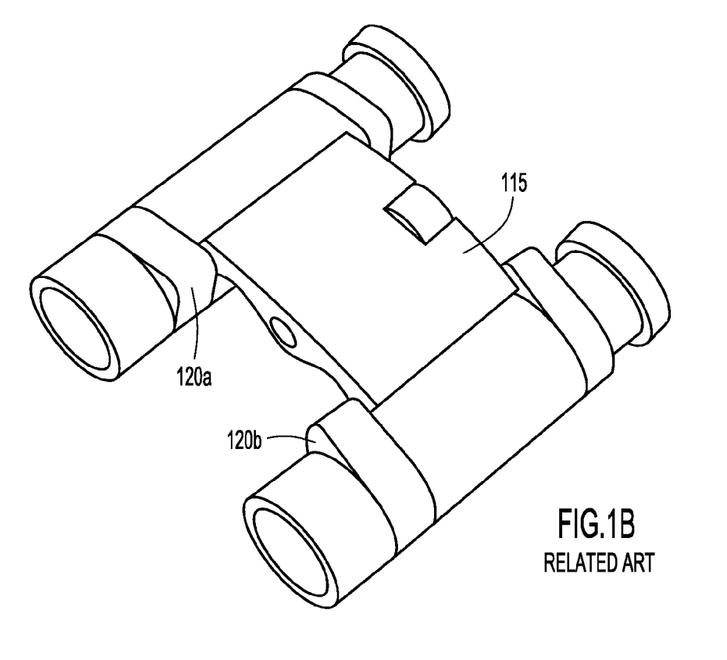

A set of binoculars, or simply "binoculars" as the term is commonly used, is such a binocular vision system; it combines two monocular telescopes, for viewing distant objects with both eyes of a viewer. To align each monocular telescope to a corresponding eye of a particular individual, conventional binoculars provide a mechanism by which the distance between the optical axes of the eyepiece optics can be adjusted to the IPD. Such adjustment mechanisms include single hinge joint implementations, such as that illustrated in FIG. 1A, in which both monoculars pivot about the same axis of rotation defined through hinge joint 110. Another conventional binocular adjustment mechanism is the lateral bridge, such as that illustrated in FIG. 1B, in which each monocular is coupled to a central bridge 115 through a separate hinge joint 120a-120b, and each monocular pivots about separated axes of rotation. In each of these implementations, the IPD setting, i.e., the state in which the distance between the optical axes of the binocular eyepieces matches the IPD for a particular viewer, is achieved by rotation of the monoculars about the one or more hinge joint axes.

It is considered beneficial that many conventional binocular designs can be folded at the hinge joints into a compact configuration for purposes of storage. However, such folding relocates the optical axes and, consequently, it is necessary to reestablish the IPD setting at the time the binoculars are next used. Additionally, since the rotational axis through the hinge is constrained to parallelism with the optical axes of the monoculars (otherwise rotation about the hinge joint would skew the optical axes away from the sighting direction), the axes about which the folding is realized is likewise constrained. In hands-free implementations that allow relocation of one or more monoculars away from the visual path by articulation at the hinge joint, the parallelism constraint on the folding axes limits the storage compactness, i.e., the degree to which a monocular extends from the human body during rotation thereof about the corresponding hinge joint. In certain conventional designs, the monoculars can be sufficiently removed from the eyes and face only through a long swing radius that may be prohibitive for certain deployment scenarios.

SUMMARY

A vision system is supported by an articulated support frame having at least one proximal frame member coupled to an attachment device and a pair of distal frame members that retain optical devices in fixed mutual parallelism between optical axes of the optical devices and mounting axes of the distal frame members. A number of joints are mechanically interposed between the frame members that define respective axes of rotation about which the frame members are relatively moveable. The joints afford motion of the distal frame members through spatial trajectories over which the mounting axes diverge from mutual parallelism. A bridge device immobilizes the distal frame members on their trajectories in a binocular viewing configuration in which the mounting axis are parallel.

DESCRIPTION OF EXAMPLE EMBODIMENTS

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The techniques described herein are directed to vision systems having articulated structural frameworks that accommodate anthropometric differences of the human head between human individuals. Upon review of this disclosure and appreciation of the concepts disclosed herein, the ordinarily skilled artisan will recognize other vision system contexts in which the present inventive concept can be applied. The scope of the present invention is intended to encompass all such alternative implementations.

The descriptions herein utilize anatomical planes and directions to specify spatial orientation and motion. Anatomical terms used herein are to be interpreted in light of conventionally-accepted definitions for those terms known to those skilled in the medical arts.

Figure 2A:
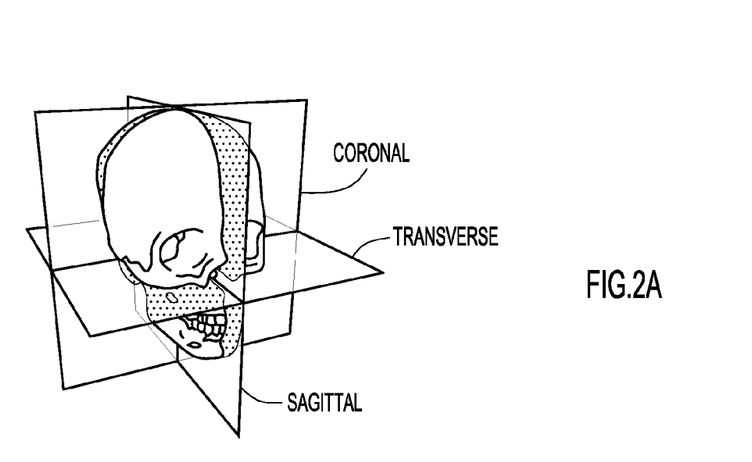
FIGS. 2A-2B are separate views of an exemplary vision system in which the present general inventive concept can be embodied.
Figure 2B:
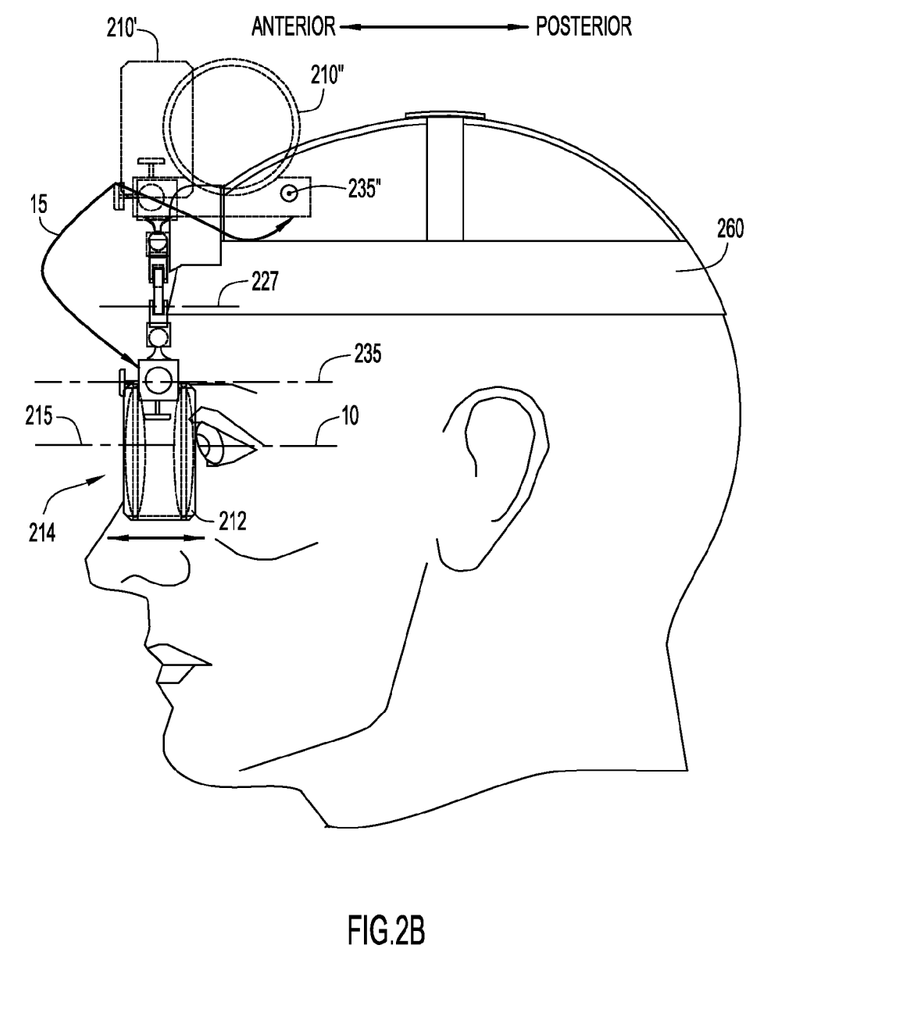

FIGS. 2A-2B, collectively referred to herein as FIG. 2, are front and side views of an exemplary vision system 200 in which the present invention may be embodied. Exemplary vision system 200 is a hands-free sighting apparatus, meaning that once vision system 200 has been placed in a particular state, configuration or position, vision system 200 can be used in that state, configuration or position without the aid of human hands. Accordingly, vision system 200 may include an attachment device 255 that connects to a wearable item, referred to herein as a personal mount 260 and representatively illustrated at cranial web 260, to support vision system 200 against gravity. Personal mount 260 should be sufficiently engaged with the human wearer, such as through friction, so that attachment device 255 follows motion of the human head and remains fixed relative to the eyes of the human user throughout movement of the head, vibration, mechanical shock, and so on.

Exemplary vision system 200 includes a pair of monocular optical devices 210r and 210l, representatively referred to herein as monocular device(s) 210. Each monocular device 210 may comprise an optical mount 212, which, as used herein, is a mechanical fixture that retains optical elements, generally illustrated at optical element set 214, in an alignment that defines an optical sighting axis 215 (see FIG. 2B). When sighting a target (not illustrated), each optical sighting axis 215 is aligned to a corresponding optical axis 10 (see FIG. 2B) of the human eye, referred to herein as ocular axis 10. The optical element set 214 retained in optical mount 212 may include refractive elements, such as optical lenses, partially- and totally-reflective elements such as prisms and mirrors, etc., essentially without limitation. Optical mount 212 may also retain non-refractive/non-reflective elements such as gun sights, reticles, as well as other components and systems such as image intensifiers, cameras, displays, etc.

Exemplary vision system 200 comprises an articulated support frame 220 mechanically coupled to monocular devices 210. Support frame 220 may be constructed from a plurality of frames members representatively illustrated at frame members 222a-222c and representatively referred to herein as frame member(s) 222. Frame members 222 are interconnected one with another through a plurality of joints, representatively illustrated at joints 224a-224c and representatively referred to herein as joint(s) 224. The present invention is not limited to a particular number or to particular types of frame members 222 and joints 224 or to particular materials from which frame members 222 and joints 224 are constructed. Frame members 222 may be of any length, shape, cross-sectional profile, etc., suitable to the implementation of vision system 200. Joints 224 may be implemented in numerous joint configurations including hinged joints, such as those illustrated at joints 224a and 224b, ball joints, such as at joint 224c, prismatic (sliding) joints, elastic joints, etc., essentially without limit.

Support frame 220 may include a pair of distal frame members 230l and 230r, representatively referred to herein as distal frame member(s) 230. Distal frame members 230 may have respective mounting sites 232r and 232l at which to receive monocular devices 210. Monocular devices 210 are retained in the respective distal frame members 230 by suitable mounting hardware (not illustrated). In certain embodiments, the mounting hardware by which the monocular devices 210 are retained in distal frame members 230 include shafts, linear bearings, and the like that support the monocular devices 210 against gravity while allowing translational motion in one or more directions. Such shafts and/or bearings may be incorporated into offset positioning mechanisms 240r and 240l, representatively referred to herein as positioning mechanism(s) 240, by which the monocular devices 210 are movable in at least one direction relative to the distal frame members 230 in which they are mounted. In the exemplary embodiment illustrated in FIG. 2, each positioning mechanism 240 include positioning controls: an anteroposterior positioning control 244, by which each monocular device 210 is moved toward and away from the corresponding eye of the individual, a superoinferior positioning control 246, by which each monocular device 210 is moved toward and away from the corresponding brow ridge of the individual, and a mediolateral positioning control 242, by which each monocular device 210 is moved toward and away from the nose of the individual. By way of the separate positioning mechanisms 240, each monocular device 210 can be spatially offset along at least one spatial dimension relative to some fixed, arbitrary datum independently of the spatial offset imparted to the other monocular device 210. In certain embodiments of the present invention, positioning mechanism 240 is configured or otherwise constructed to enable at least mediolateral offsets of the monocular devices 210 to be independently controlled at each eye of the viewer. When so embodied, the IPD separation of monocular devices 210 is established by independently established right pupillary distance (RPD), i.e., the distance between the sagittal plane line bisecting the human head and the right pupil of the viewer, and left pupillary distance (LPD), i.e., the distance between the sagittal plane line and the viewer's left pupil. It is to be understood that, in embodiments of the invention, some offset positioning may be independently controllable at each eye along one or more spatial dimensions, while some offset positioning may be mutually controllable across both eyes along one or more other spatial dimensions. Additionally, it is to be understood that the offset positioning may be incorporated at locations in support frame 220 other than in the distal frame members 230. Those having skill in the art will recognize numerous offset mechanisms and control configurations that can be utilized in vision systems without departing from the spirit and intended scope of the present invention. As used herein, the term "offset positioning mechanism" encompasses the independent and mutual offset positioning mechanisms and associated positioning controls implemented in embodiments of the invention.

Vision system 200 may include a bridge device 250 that immobilizes one or more frame members 222 and/or distal frame members 230 of the articulated support frame 220 in a binocular viewing configuration. As used herein, a binocular viewing configuration is characterized by the optical sighting axes 215 of the respective monocular devices 210 being substantially parallel one with the other and being aligned with corresponding ocular axes 10 of the viewing individual as positioned by offset positioning mechanism 250. As illustrated in FIG. 2, exemplary bridge device 250 is rigidly anchored at attachment device 255, which connects to a wearable item on the human individual, e.g., cranial web 260, and spans from one distal frame member 230 to the other. Bridge device 250 may include suitable retention mechanisms (not illustrated in FIG. 2), e.g., clips, detents, magnets, by which distal frame members 230 are sufficiently retained therein against gravity, movement of the head, vibration, mechanical shock, and so on. However, the retention mechanisms allow distal frame members 230 to be released from exemplary bridge device 250 by suitable force applied by the user or by activation of a suitable release mechanism. Each distal frame member 230 may be independently released from and captured in bridge device 250.

Joints 224 in support frame 220 may be characterized by one or more axes of rotation, representatively illustrated by rotation axis 227 in FIG. 2B, the degrees of freedom through which the joints 224 permit motion being particular to the type of joint being used at each location in support frame 220. Embodiments of the invention are implemented through a set of joints 224 and frame members 222 so that each distal frame member 230 and the corresponding monocular devices 210 retained thereby is permitted freedom of movement along respective spatial trajectories, representatively illustrated at trajectory 15 in FIG. 2. The present invention is not limited to particular trajectories afforded by support frame 220. Certain implementations may permit a high degree of motion in distal frame members 230 by which monocular devices 210 can be positioned at arbitrary positions. In other implementations, motion by distal frame members 230 may be significantly constrained to a fixed path by which monocular devices 210 are allowed limited positioning. In certain embodiments, support frame 230 implements a number of stations along the trajectories at which distal frame members 230 and corresponding monocular devices 210 may be parked, i.e., held in position without manual support by the viewer. For example, as illustrated in FIG. 2B, distal frame member 230$l$ may be compelled by manual manipulation of the user from a first station corresponding to the binocular viewing configuration, along trajectory 15 to a second station indicated by the primed reference numerals (210' and 230'). Distal frame member 230$l$ and monocular device 210$l$ may be parked at the second station through a variety of mechanisms, including strategically placed detents, stops, cam locks, to name but a few, in support frame 220, such as in and/or around joints 224. In FIG. 2B, trajectory 15 by rotation of distal frame member 230 from the second station to a third station indicated by the double primed reference numerals (210" and 230"). Distal frame member 230$l$ and monocular device 210$l$ may be parked at the third station by mechanisms similar to those used to park the components at the second station. Distal frame member 230$l$ and monocular device 210$l$ may traverse trajectory 15 in the reverse direction to return to the first station.

It is to be noted that over trajectory 15, mounting axis 235 illustrated in FIG. 2B, which is parallel with optical axes 215, undergoes a change in orientation. In the binocular viewing configuration, mounting axes 235 are substantially parallel (as are optical axes 215), but at station 3, mounting axes 235 diverge from parallelism. This feature of embodiments of the present invention can implement a form-fitting stow configuration, such as that described below, in which the mounting axes 235 are splayed while implementing a binocular viewing configuration where the mounting axes are parallel.

Bridge device 250 may be positioned to intercept trajectory 15 along which mounting member 230 is conveyed. That is, mounting member 230 may be constrained by support frame 220 to a path that is aligned with and terminates directly in the retention mechanism of bridge device 250. When so embodied, monocular devices 210 can be placed into and out of the binocular viewing configuration with minimal to no requirement for manual alignment by the viewer. However, even in embodiments without such constrained trajectories, it is to be understood that the capture of distal frame member 230 in the bridge device 250 is repeatable to the extent that the offsets set by offset mechanisms 240 relative to the aforementioned fixed datum are maintained over successive trajectory traversals.

FIGS. 3A-3E, collectively referred to herein as FIG. 3, are different views of another vision system embodying the present invention, i.e., night vision (NV) binoculars 300. NV binoculars 300 comprise a pair of monocular devices 310$l$ and 310$r$, representatively referred to herein as monocular(s) 310, containing active components such as image intensifier tubes for viewing targets in darkness. However, it is to be understood that night vision features of exemplary vision system 300 are not essential to the invention.

Exemplary NV binoculars 300 include an articulated support frame 320 comprising frame members 322$a$ and 322$b$, representatively referred to herein as frame member(s) 322, joints 324$a$, 324$b,r$ and 324$b,l$, representatively referred to herein as joint(s) 324, and distal frame members 330$r$ and 330$l$, representatively referred to herein as distal frame member(s) 330. Exemplary NV binoculars 300 also include a bridge device 350 and an attachment device 355. Frame members 322, joints 324, distal frame members 330, bridge device 350 and attachment device 355 serve similar purposes as their like-named counterparts described above with reference to FIG. 2, with certain differences noted below.

In the embodiment of FIG. 3, bridge device 350 is incorporated into support frame 320 and implements dual functionality, i.e., that of another frame member and that of bridge device. Additionally, in addition to pivoting joints, exemplary support frame 320 includes sliding joints 344 and 346 by which bridge device 350 is spatially offset relative to attachment device 355. In vision system 300, anteroposterior and superoinferior offsets are applied to bridge device 350 through sliding joints 344 and 346, respectively. Thus, sliding joints 344 and 346 form a part of —offset positioning system 340 along with mediolateral offset devices 342$r$ and 342$l$.

Figure 3A:
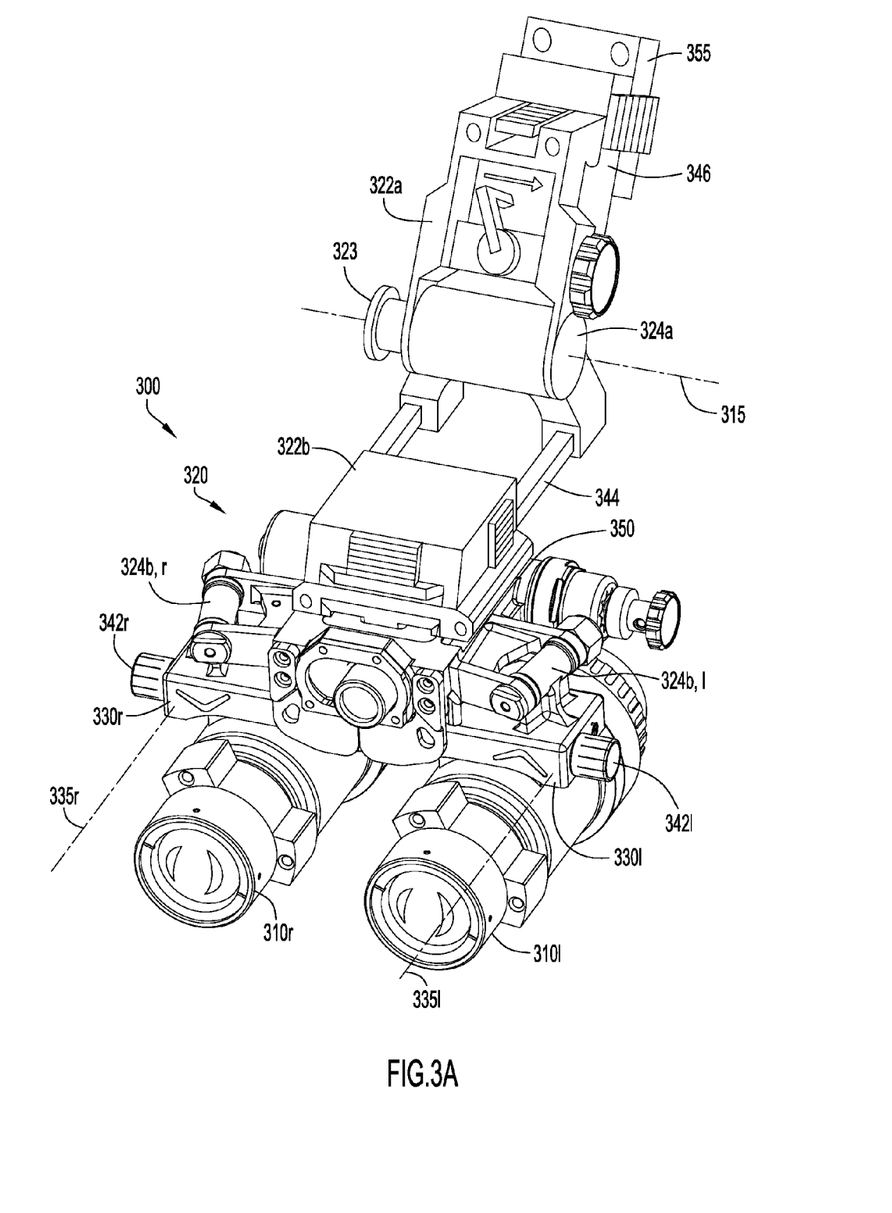
FIGS. 3A-3E are diagrams of exemplary night vision system in which the present general inventive concept can be embodied.
Figure 3B:
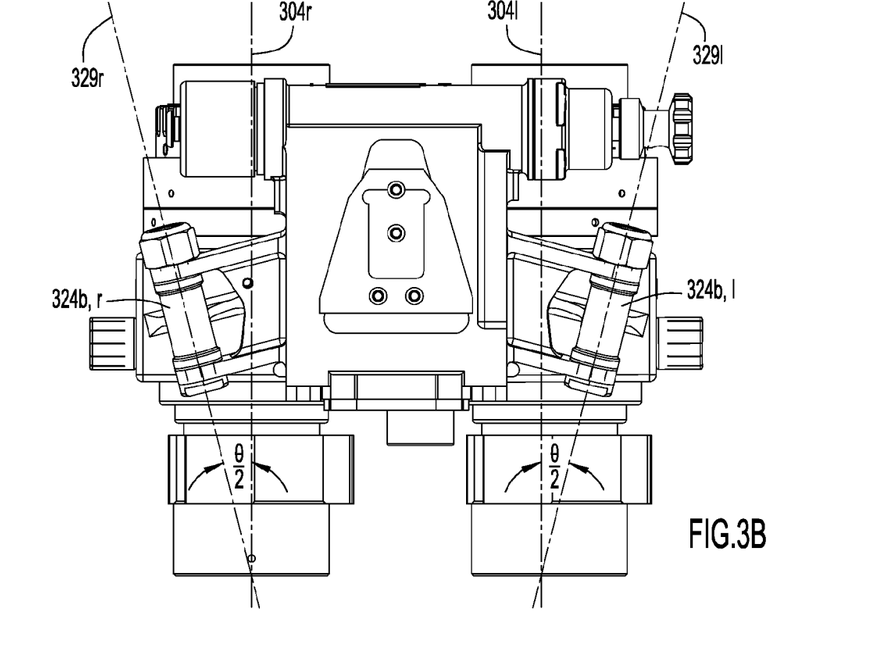
Figure 3C:
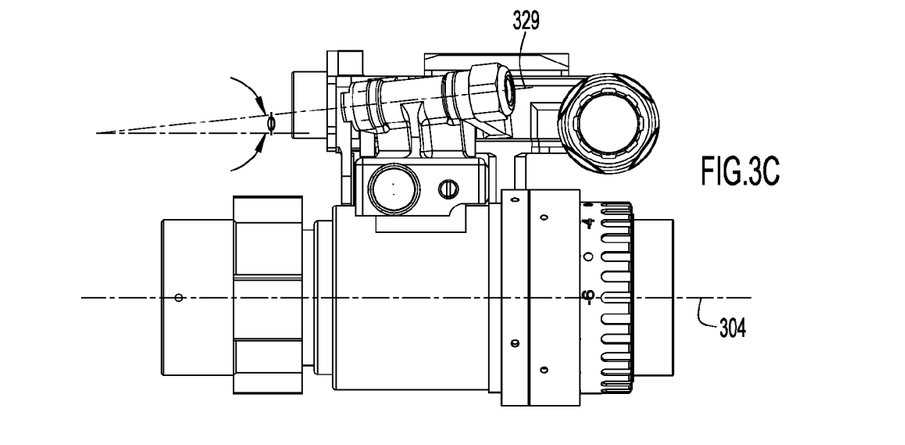

As illustrated in FIG. 3A, axis of rotation 315 of joint 324$a$ extends mediolaterally in the transverse plane through the head. Joint 324$a$ may also incorporate a locking mechanism 323 that stops rotation in one or more rotation angles, at least one of which corresponds to the binocular viewing configuration. As illustrated in FIGS. 3B-3C, joints 324$b,l$ and 324$b,r$ define compound axes of rotation 329$l$ and 329$r$. That is, an angle θ is defined between axes of rotation 329$l$ and 329r in a transverse plane and define an angle ϕ relative to optical sighting axes 304 in a plane that is perpendicular to the transverse plane. The spatial orientations of the joints 324 establish particular trajectories through which distal frame members 330 are conveyable, as will be described further below.

Figure 3D:
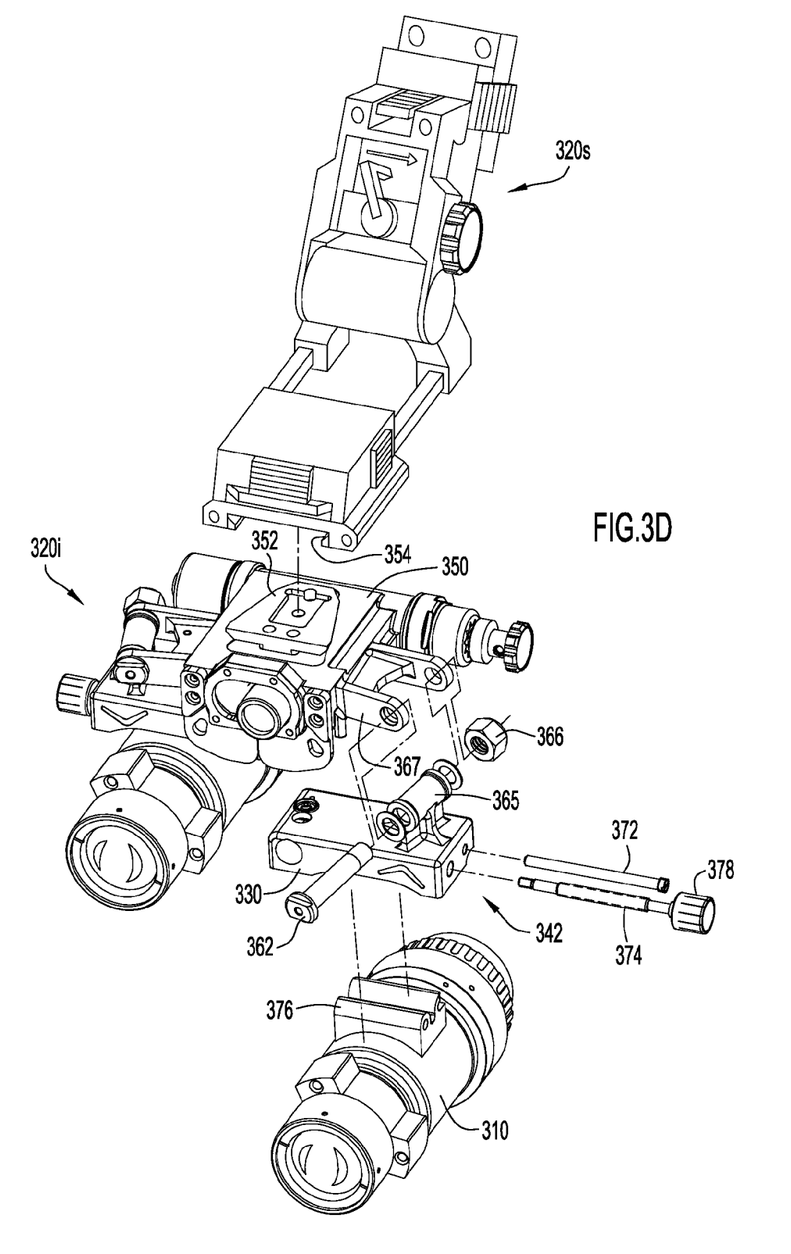

As illustrated in FIG. 3D, support frame 320 may be separable into a superior sub-frame 320s and an inferior sub-frame 320i. Sub-frames 320s and 320i may be joined by a connector, such as a sliding mount rail 352 and complementary slot 354. Accordingly, superior sub-frame 320s can be implemented by standardized commercially-available mounting devices selected in accordance with whatever wearable item is chosen by the user.

FIG. 3D provides an exploded view of mediolateral offset positioning mechanism 342, corresponding joint 324b and corresponding distal frame member 330. As illustrated in the figure, male hinge member 365 of joint 324b may be formed in unitary construction with distal frame member 330 and female hinge member 367 may be formed in unitary construction with bridge device 350. Hinge pin 362 may be inserted through male hinge member 365 and female hinge member 367 and held in place by, for example, a nut 366. The present invention is not limited to the illustrated hinge construction of joint 324b.

Mediolateral offset positioning mechanism 342 comprises a rail 376 affixed to monocular device 310, which may be supported in distal frame member 330 by slide pin 372. A threaded actuator 374 may be passed through distal frame member 330 and engage with complementary threads formed in rail 376. Mediolateral translation of monocular device 310 relative to distal frame member 330 is achieved by rotating control knob 378 formed on actuator 374. Those having skill in the art will recognize alternative positioning mechanisms that can be used in embodiments of the present invention without departing from the spirit and intended scope thereof.

Figure 3E:
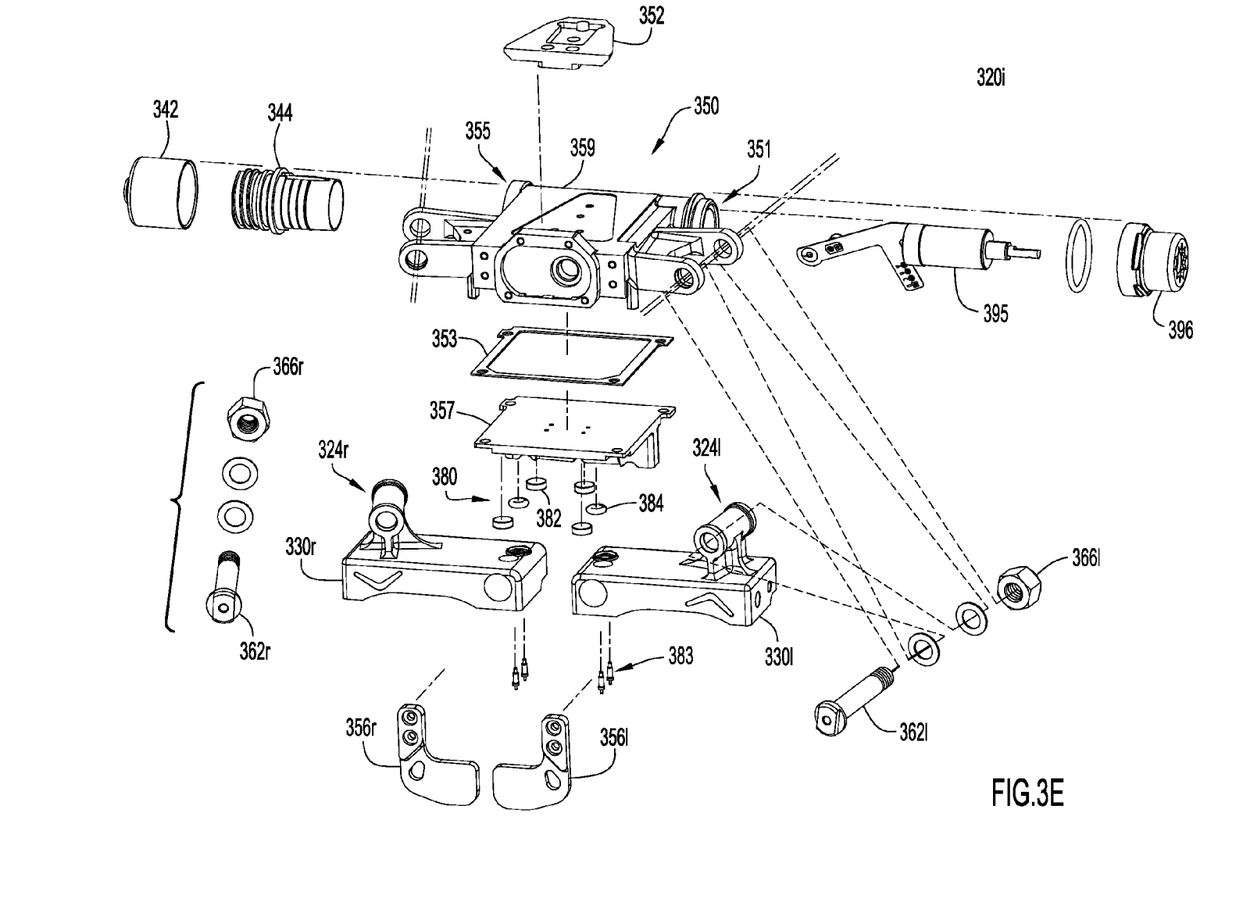

FIG. 3E is an exploded view of inferior sub-frame 320i for describing exemplary features of NV binoculars 300 not previously described herein. Bridge device 350 may comprise a bridge body 359 that structurally supports distal frame members 330 through joints 324 as described above. Bridge body 359 may also support and/or encase electrical and electronic components for, among other things, the night vision features of NV binoculars 300. For example, a circuit board (not illustrated) may be mounted in a chamber 358 interior to bridge body 359 and enclosed therein by gasket 353 and cover 357. A battery (not illustrated) may be enclosed in bridge body 359 in a battery port 355, collar 394 and cap 392. A power switch 395 may be mounted in bridge body 359 at switch port 351 and retained therein by a switch cap 396. One or more activation switches 363 may be installed between bridge body 359 and distal frame members 330, by which power may be supplied and removed from monocular devices 310 received in distal frame members 330 at mounting sites 335 when the monocular devices 310 are not in position for viewing.

Distal frame members 330 may be retained in respective viewing positions by one or more catches 380 having complementary mating members. In one embodiment, the complementary mating members comprise of metal inserts 384 and magnets 382. Magnets 382 may be rare earth magnets producing sufficiently strong magnetic fields to require a significant deliberately-applied force to separate distal frame member 330 from bridge body 359. The attracting force of such magnetic field may also be helpful in drawing distal frame members 330 into position when they are captured by bridge device 350, as described above. Capturing mechanisms other than magnets, e.g., frictional catches, spring-loaded detents, over-center mechanisms, etc., may be used to retain distal frame members 330 without departing from the spirit and intended scope of the present invention.

Additional alignment of distal frame members 330 and bridge device 350 may be achieved through a pair of anteroposterior stops comprising flexures 356l and 356r, representatively referred to herein as flexures 356, and posterior stop 352. Flexures 356 may be mounted on bridge body 359. In one embodiment, flexures 356 may apply a resilient or spring force on distal frame members 330 against posterior stop 352 formed on bridge body cover 357. The combination of magnetic catches 382 and anteroposterior stops 356/352 ensure that distal frame members 330 are consistently and precisely captured at the same positions relative to the bridge device 350 to the extent that any offset imparted by the viewer through offset positioning mechanism 340 is maintained over repeated trajectory traversals.

Figure 4A:
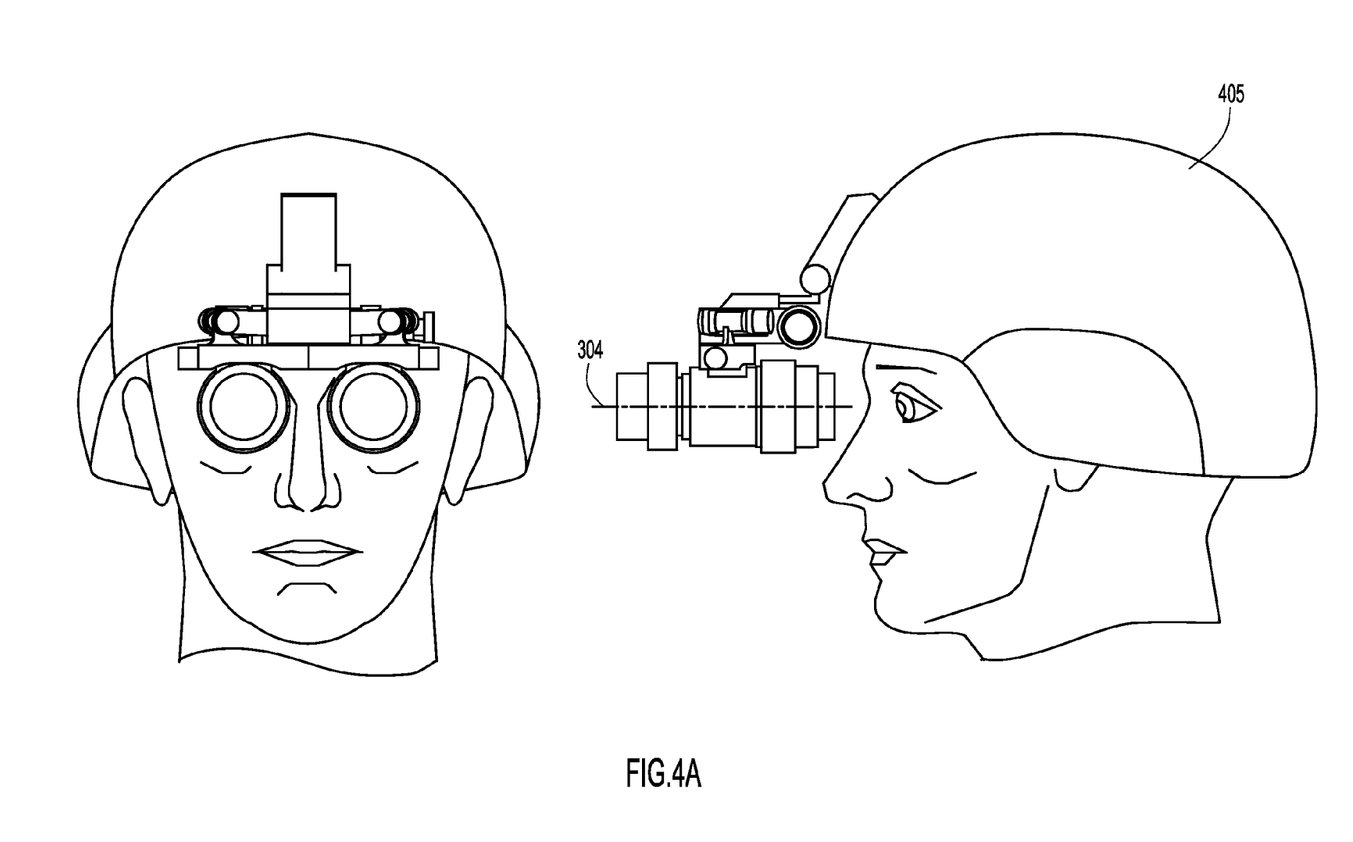
FIGS. 4A-4E are diagrams of different configurations in which the exemplary vision system of FIGS. 3A-3E can be placed through the present general inventive concept.
Figure 4B:
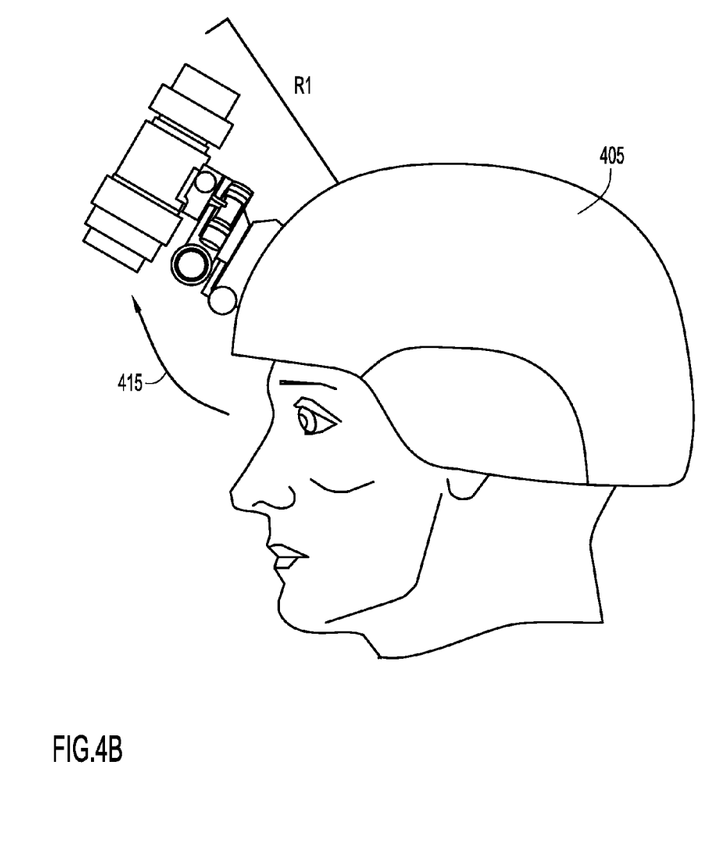
Figure 4C:
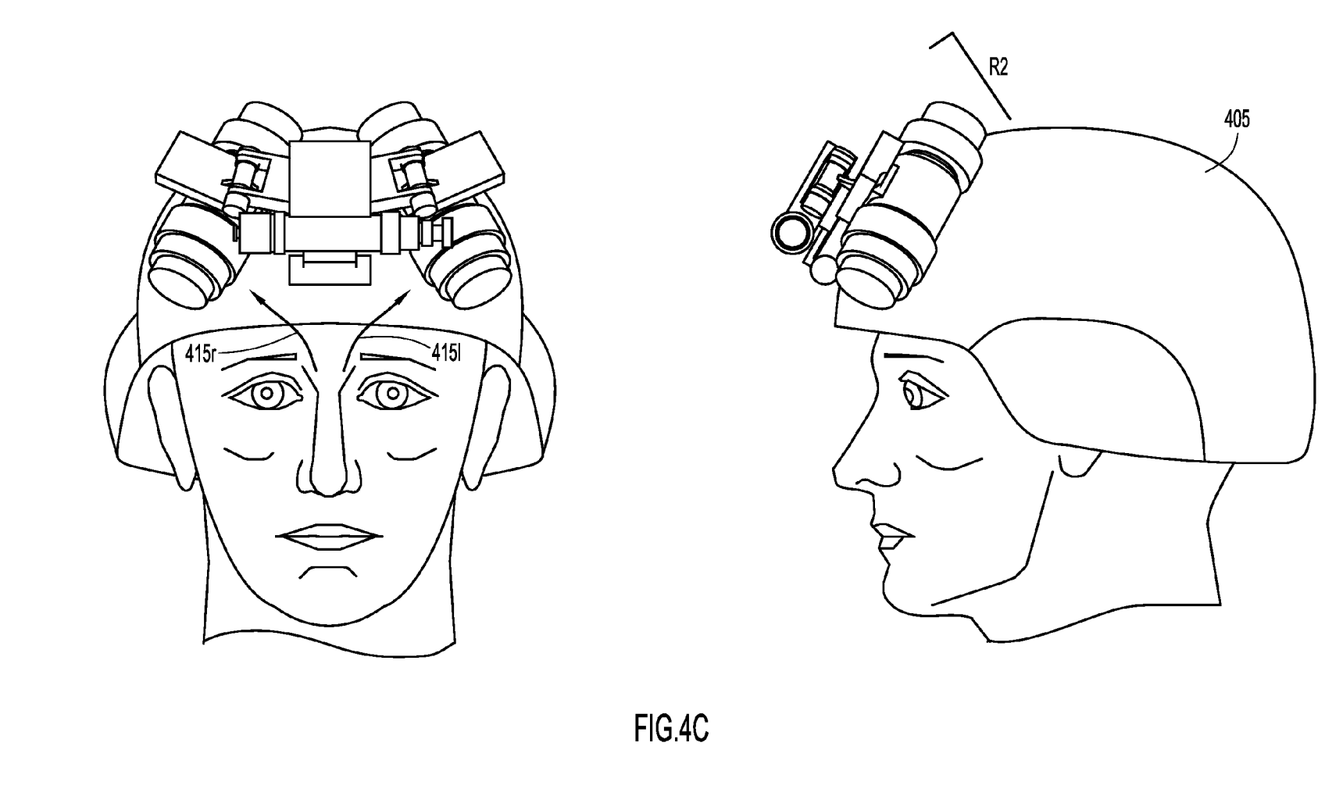

FIGS. 4A-4E, collectively referred to herein as FIG. 4, are illustrations of different configurations in which NV binoculars 300 may be placed in accordance with the present invention. In FIG. 4A, NV binoculars 300 are in the binocular viewing configuration in which optical sighting axes 304 of both monocular devices are parallel one with the other although possibly offset, and aligned with the corresponding ocular axes. In FIG. 4B, bridge device 350 has been rotated through joint 324a thus carrying distal frame members 330 through respective trajectories 415l and 415r to park distal frame members 330 at respective intermediate stations thereon. When so parked, it is to be observed that optical axes 304 remain parallel and that monocular devices 310 are elevated over the surface of helmet 405 by a distance R1. In FIG. 4C, NV binoculars 300 are in a stow configuration, in which monocular devices 310 have been rotated about the compound axes of rotation of joints 324b and due to the combination of angles θ and ϕ, the monocular devices 310 are form-fitting to the pseudo-spherical surface of helmet 405. Monocular devices 310 are disposed in close proximity to helmet 405, extending above that surface at a distance R2<R1.

Figure 4D:
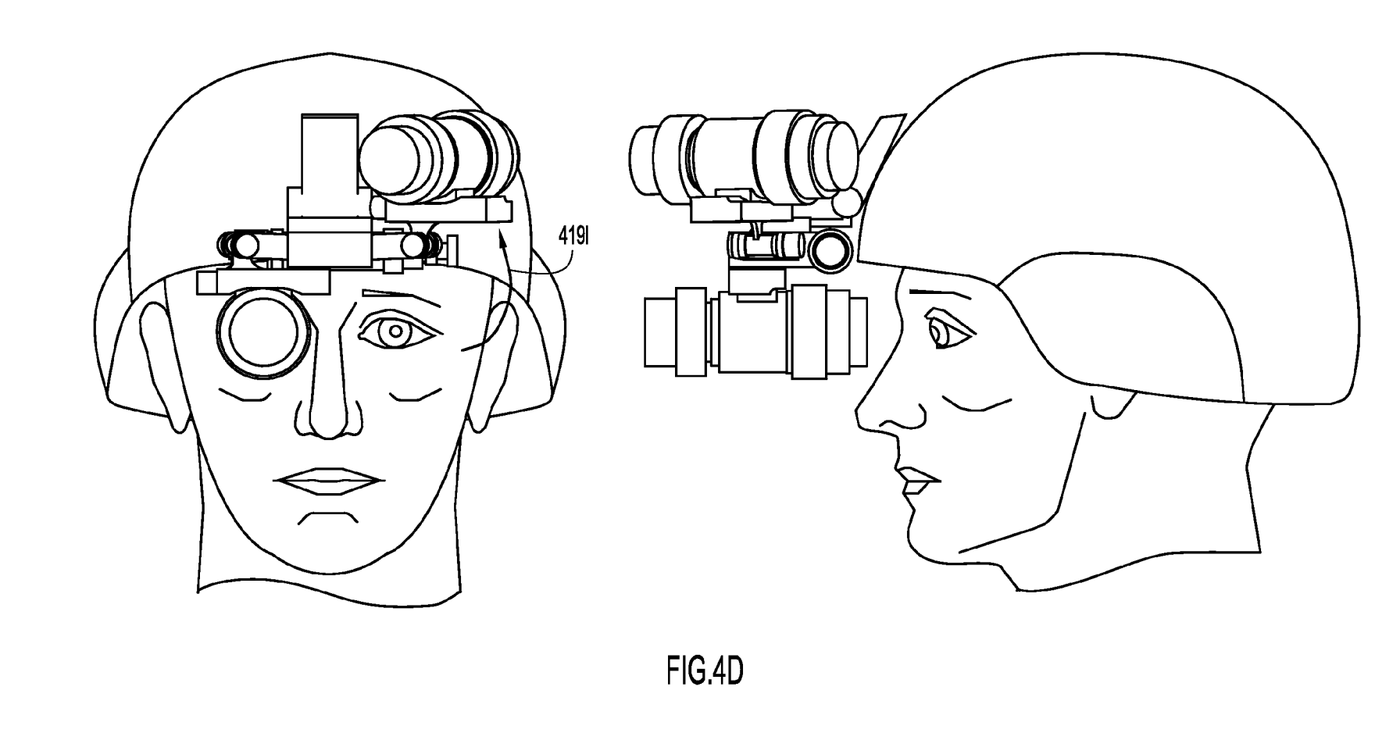
Figure 4E:
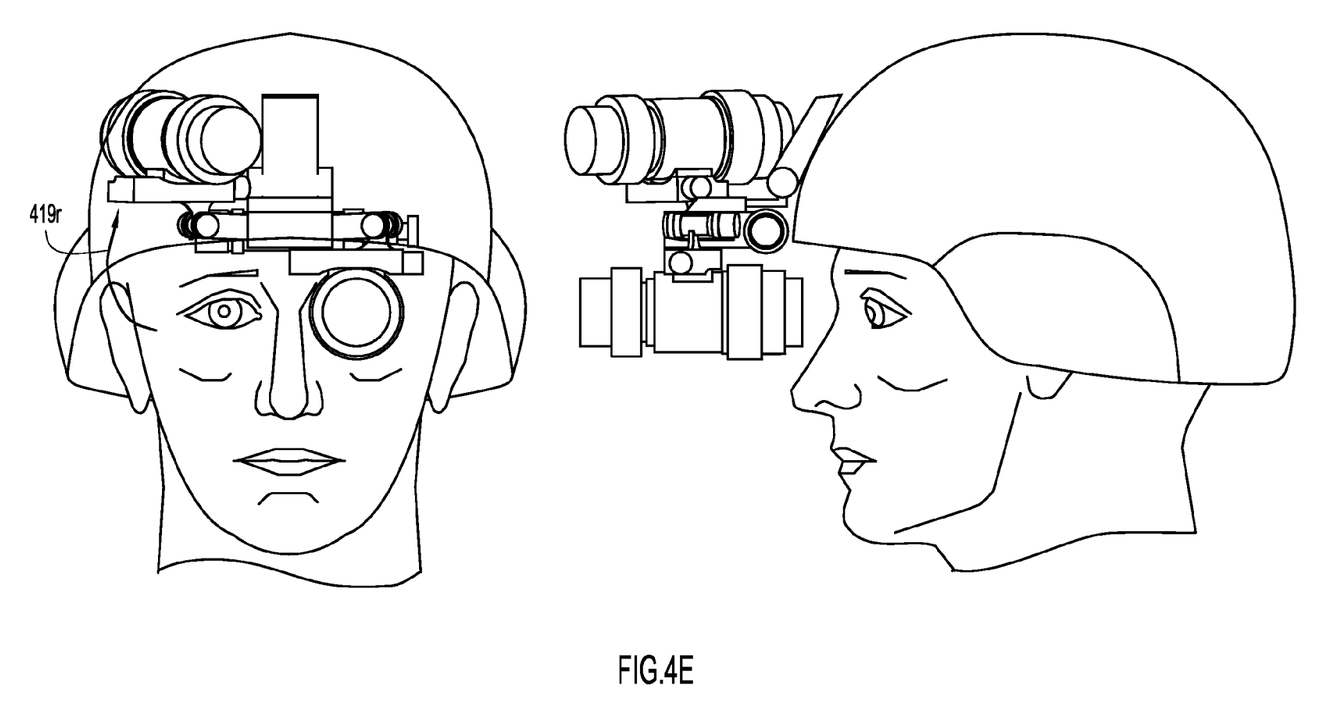

In FIGS. 4D and 4E, monocular configurations are illustrated. In both figures, one monocular device 310 is in a viewing position in which its optical sighting axis 304 is aligned with the corresponding ocular axis, and the other monocular device 310 has been rotated about corresponding joint 324b through a trajectory 419l or 419r.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A mechanical framework for a vision system comprising:
  an attachment device;
  an articulated support frame comprising:
    at least one proximal frame member mechanically coupled to the attachment device and a pair of distal frame members configured to retain respective optical devices in fixed mutual parallelism between optical axes of the respective optical devices and mounting axes of the respective distal frame members; and a plurality of joints mechanically interposed between the frame members and defining respective axes of rotation about which the frame members are moveable relative one to another to afford thereby motion of the distal frame members through respective spatial trajectories that mutually terminate in a stow configuration in which the mounting axes are non-parallel one with the other and in a binocular viewing configuration in which the mounting axes are parallel one with the other; and a bridge device by which the distal frame members are immobilized on their respective spatial trajectories in the binocular viewing configuration.

2. The mechanical framework of claim 1, wherein the bridge device defines a transverse plane in which none of the axes of rotation of the joints are parallel with any other of the axes of rotation of the joints.

3. The mechanical framework of claim 1, wherein the attachment device is configured to mechanically couple with a wearable item engaged with a human individual at a predetermined position relative to the human head.

4. The mechanical framework of claim 1 further comprising offset positioning mechanisms mechanically coupled to the respective distal frame members, each offset positioning mechanism comprising:

an optical device mount configured for coupling to a corresponding one of the optical devices; and at least one actuator engaged with the optical device mount and being configured to move the optical device mount relative to the corresponding distal frame member along a corresponding at least one spatial dimension responsive to an actuating force applied thereto.

5. The mechanical framework of claim 4, wherein the offset positioning mechanisms include a mediolateral translation mechanism at each of the distal frame members, each being operable independently one from the other.

6. The mechanical framework of claim 1, wherein the articulated support frame is mechanically separable into sub-frames.

7. The mechanical framework of claim 6, wherein one of the sub-frames includes the attachment device incorporated therein and another of the sub-frames includes the bridge device incorporated therein.

8. The mechanical framework of claim 1, wherein the distal frame members are independently releasable from the bridge device to be independently moved along the respective spatial trajectories.

9. The mechanical framework of claim 8, further comprising at least one mechanical catch between the bridge device and each distal frame member, the mechanical catch being configured to selectively immobilize and release the corresponding distal frame member relative to the bridge device.

10. The mechanical framework of claim 9, wherein the mechanical catch comprises a magnet.

11. The mechanical framework of claim 9, wherein the bridge device comprises anteroposterior stops between which each distal frame member is received.

12. The mechanical framework of claim 11, wherein at least one of the anteroposterior stops is a flexure to apply a resilient force against the corresponding distal frame member in the direction of the other of the anteroposterior stops.

13. The mechanical framework of claim 1, wherein the joints include bridge joints to mechanically couple each of the distal frame members to the bridge device.

14. The mechanical framework of claim 13, wherein the bridge joints define respective compound axes of rotation.

15. The mechanical framework of claim 14, wherein the axes of rotation of the respective bridge joints are non-parallel with the mounting axes of the respective distal frame members.

16. The mechanical framework of claim 15, wherein the axis of rotation of each of the bridge joints is non-parallel with the axis of rotation of the other of the bridge joints.

17. A binocular vision system comprising:

a pair of optical devices defining respective optical sighting axes;

an attachment device;

an articulated support frame comprising:

at least one proximal frame member mechanically coupled to the attachment device and a pair of distal frame members configured to retain the respective optical devices in fixed mutual parallelism between the optical sighting axes of the respective optical devices and mounting axes of the respective distal frame members; and a plurality of joints mechanically interposed between the frame members and defining respective axes of rotation about which the frame members are moveable relative one to another to afford thereby motion of the distal frame members through respective spatial trajectories that mutually terminate in a stow configuration in which the mounting axes are non-parallel one with the other and in a binocular viewing configuration in which the mounting axes are parallel one with the other; and a bridge device by which the distal frame members are immobilized on their respective spatial trajectories in the binocular viewing configuration.

18. The binocular vision system of claim 17, wherein the bridge device defines a transverse plane in which none of the axes of rotation of the joints are parallel with any other of the axes of rotation of the joints.

19. The binocular vision system of claim 17, wherein the attachment device is configured to mechanically couple with a wearable item engaged with a human individual at a predetermined position relative to the human head.

20. The binocular vision system of claim 17 further comprising offset positioning mechanisms mechanically coupled to the respective distal frame members, each offset positioning mechanism comprising:

an optical device mount configured for coupling to a corresponding one of the optical devices; and at least one actuator engaged with the optical device mount and being configured to move the optical device mount relative to the corresponding distal frame member along a corresponding at least one spatial dimension responsive to an actuating force applied thereto.

21. The binocular vision system of claim 20, wherein the offset positioning mechanisms include a mediolateral translation mechanism at each of the distal frame members, each being operable independently one from the other.

22. The binocular vision system of claim 17, wherein the joints include bridge joints to mechanically couple each of the distal frame members to the bridge device, the bridge joints defining respective compound axes of rotation.

23. The binocular vision system of claim 22, wherein the respective compound axes of rotation of the bridge joints are non-parallel with the optical axes of the respective optical devices.

24. The binocular vision system of claim 17, wherein the articulated support frame is mechanically separable into sub-frames.

25. The binocular vision system of claim 24, wherein one of the sub-frames includes the attachment device incorporated therein and another of the sub-frames includes the bridge device incorporated therein.

26. The binocular vision system of claim 17, wherein the distal frame members are independently releasable from the bridge device to be independently moved along the respective spatial trajectories.

27. The binocular vision system of claim 26, further comprising at least one mechanical catch between the bridge device and each distal frame member, the mechanical catch being configured to selectively immobilize and release the corresponding distal frame member relative to the bridge device.

28. The binocular vision system of claim 27, wherein the bridge device comprises anteroposterior stops between which each distal frame member is received.

29. The binocular vision system of claim 28, wherein at least one of the anteroposterior stops is a flexure to apply a resilient force against the corresponding distal frame member in the direction of the other of the anteroposterior stops.

* * * * *